No. 836,078. PATENTED NOV. 20, 1906.
C. BACHE-WÜG.
APPARATUS FOR RECOVERING FIBERS AND OTHER PARTICLES FROM WASTE WATER.
APPLICATION FILED JAN. 27, 1906.
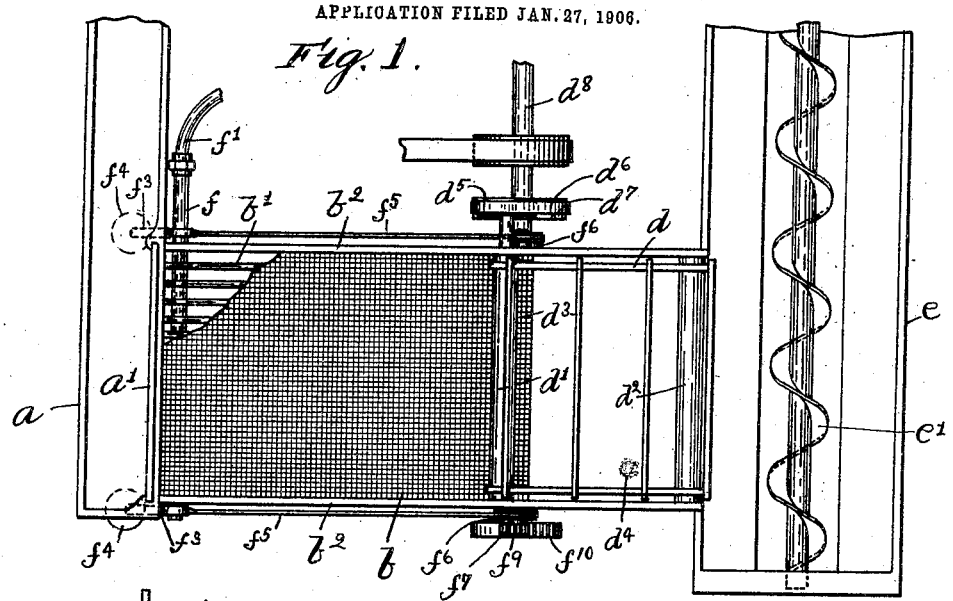

UNITED STATES PATENT OFFICE.

CARL BACHE-WÜG, OF GLENS FALLS, NEW YORK, ASSIGNOR OF ONE-HALF TO ALFRED M. MEINCKE, OF BOSTON, MASSACHUSETTS.

APPARATUS FOR RECOVERING FIBERS AND OTHER PARTICLES FROM WASTE WATER.

No. 836,078.　　　　　Specification of Letters Patent.　　　　Patented Nov. 20, 1906.

Application filed January 27, 1906. Serial No. 298,141.

*To all whom it may concern:*

Be it known that I, CARL BACHE-WÜG, of Glens Falls, county of Warren, State of New York, have invented an Improvement in Apparatus for Recovering Fibers and other Particles from Waste Water, of which the following description, in connection with the accompanying drawings, is a specification, like characters on the drawings representing like parts.

In the manufacture of paper and also pulp the waste water from the wet machines and from the other machines contains many small fibers, as well as particles of the different materials used as fillers, &c., and in the trade this waste water is commonly called "white" water. The white water is partly reused; but notwithstanding this fact these small fibers and particles are for the most part lost.

This invention has for its object to construct an apparatus especially designed to recover these fibers and other particles from the waste water or white water.

The invention consists, essentially, in the employment of an improved form of screen of very fine mesh, which allows the water to pass through it freely, but which retains the fibers and other particles, and means for delivering the waste water thereto and means for removing the fibers and other particles from the screen, which are deposited thereon as the water passes through it; also, in means for moving along the fibers and other particles on the screen or so floating them along on the screen in the direction toward the end thereof that they shall collect for the most part at the end of the screen in order that they may be readily removed by suitable means provided for removing them; also, in means for preventing the fibers and other particles which are deposited on the screen from clogging the screen, and thereby incapacitating it from performing its duty.

Figure 1 shows in plan view an apparatus embodying this invention for recovering fibers and other particles from waste water. Fig. 2 is a side view of the apparatus shown in Fig. 1. Fig. 3 is a vertical section of the apparatus shown in Fig. 2, taken on the dotted line 3 3. Fig. 4 is a sectional detail of the means employed for freeing the screen from the fibers and other particles which are deposited thereon.

$a$ represents a sluiceway for conducting the waste water carrying the fibers and other particles to the screen, it having outlets near its end which are adapted to be opened and closed and otherwise regulated by a gate $a'$. The screen is horizontally disposed beside the sluiceway and consists of a large piece of textile fabric $b$—such, for instance, as silk—which is supported upon an open-work frame $b'$, which is herein shown as a set of closely-arranged parallel bars, or in lieu of said parallel bars a wire-netting may be employed, or, in fact, any other form of open-work-frame which will properly support the textile fabric and not interfere with its screening functions. I employ textile material particularly on account of its fine mesh; but I may employ as an equivalent therefor any other material of equally fine mesh. The sluiceway, which is located at one end of the screen, provides one end wall for the screen, and the screen is provided with side walls $b^2$ of any suitable height, which extend from end to end thereof. The waste water or white water carrying the fibers or other particles is delivered upon the horizontal screen, and the water passes freely through the meshes thereof, leaving the fibers and other particles deposited upon the screen.

Below the screen a conical or other shaped basin $c$ is provided which receives the water which passes through the screen, and said basin has an outlet at the bottom which is connected to any suitable waste-pipe for the escape of the water.

At the end of the screen opposite the sluiceway means are provided for removing the fibers and other particles from the screen which have been deposited thereon, and, as herein shown, said means consist of an endless carrier $d$, supported upon rolls $d'$ $d^2$ and bearing a plurality of blades $d^3$ or strips, which are adapted to be brought successively into engagement with the screen or near enough thereto to remove the fibers and other particles which are deposited on the screen and which are collected at the end thereof. As the carrier is operated these blades successively operate to remove the accumulated fibers and other particles from the screen and carry them along on a suitable flooring $d^4$, which is provided in continuation of the screen and which is located beneath the carrier, and to deliver the same to a suitable receptacle $e$. The receptacle $e$ is made as a long conical or other shaped trough, and at the bottom of said receptacle a feed-screw $e'$ is placed, which is adapted to discharge the fibers and other particles therefrom. The carrier is operated continuously, and the shaft of its roller $d'$ has a pulley $d^5$ thereon, over which a belt $d^6$ passes, which passes around a pulley $d^7$, secured to the main shaft $d^8$.

The waste water is discharged from the sluiceway upon the horizontal screen with considerable force, and the tendency is for the fibers and other particles to be floated along and also moved by the force of the water in a direction toward the carrier, so that they will collect for the most part at the end of the screen, so as to be engaged by the means provided for removing them.

For the purpose of cleaning the screen to prevent clogging and also to more or less assist the movement of the fibers and other particles along on the screen in a direction toward the end thereof a pipe $f$ is located below the screen, having a series of orifices in its upper side for the purpose of directing small jets of water with considerable force against the under side of the screen. (See Fig. 4.) This pipe is movably supported at one end, being attached to a piece of flexible hose $f'$, which is connected to any suitable source of supply. The pipe has attached to it two cords $f^2$, one at each end thereof, which pass over idle pulleys $f^3$, and to the ends of said cords weights $f^4$ are attached, and said weighted cords act to hold the pipe in horizontal position beneath the screen and also operate to move said pipe in a direction toward one end of the screen. Other cords $f^5$ are also attached to said pipe, which extend in the opposite direction and pass over winding-drums $f^6$, which are secured to a shaft $f^7$, and as said shaft is rotated and the winding-drums turned the cords will be wound thereon and the pipe $f$ moved toward the opposite end of the screen in opposition to the action of the weights $f^4$. A pinion $f^9$ is secured to the shaft $f^7$, which is engaged by a mutilated gear $f^{10}$, secured to the main shaft $d^8$, and as the main shaft revolves said mutilated gear will engage and rotate the pinion $f^9$ and then disengage the same, and by means of this construction the pipe $f$ will be moved first in one direction toward one end of the screen by the cords winding up on the winding-drums and then in the opposite direction toward the opposite end of the screen as the cords are drawn off of said winding-drums by the action of the weights. The pipe $f$ is thus reciprocated or moved back and forth beneath the screen, and being located close to the screen the small jets of water issuing from the orifices thereof will engage the under side of the screen with considerable force and will act to not only clear the screen so as to prevent undue clogging, but also will assist in floating or moving along the fibers and other particles toward the end of the screen to accumulate at such point, so as to be engaged by the means employed for removing them.

I do not desire to limit my invention to the particular means herein shown for removing the accumulated fibers and other particles from the screen, nor to the particular means herein shown for floating or otherwise moving the fibers and other particles along on the screen toward the end thereof, nor to the particular means herein shown for clearing the screen. Furthermore, I desire it to be understood that my improved screen may be employed for removing foreign particles from water when desired.

Having thus described my invention, what I claim as new, and desire to secure by Letters Patent, is—

1. In an apparatus for recovering fibers and other particles from waste water, a horizontal screen, means for floating the fibers and other particles along on said screen, toward the end thereof, and means for removing the fibers and other particles which accumulate at the end of the screen, substantially as described.

2. In an apparatus for recovering fibers and other particles from waste water, a horizontal screen, means for delivering the waste water thereto, and for floating the fibers and other particles along on the screen, toward the end thereof, and means for removing the fibers and other particles which accumulate at the end of the screen, substantially as described.

3. In an apparatus for recovering fibers and other particles from waste water, the combination of a horizontal screen consisting of a piece of textile fabric supported upon an open-work frame, a sluiceway for the waste water, having an outlet for delivering its contents upon said screen, and means for removing, from the screen, the fibers and other particles which have been deposited thereon, substantially as described.

4. In an apparatus for recovering fibers and other particles from waste water, the combination of a horizontal screen, a sluiceway for the waste water, having an outlet for delivering its contents upon said screen, means for moving the fibers and other particles along on the screen, in a direction toward the end thereof, and means for removing the fibers and other particles which accumulate at the end of the screen, substantially as described.

5. In an apparatus for recovering fibers and other particles from waste water, the combination of a horizontal screen, a sluiceway for the waste water, having an outlet for delivering its contents upon said screen, means for moving the fibers and other particles along on the screen, in a direction toward the end thereof, an endless carrier, at the end of the screen bearing blades which remove the accumulated fibers and other particles therefrom, substantially as described.

6. In an apparatus for recovering fibers and other particles from waste water, the combination of a horizontal screen, a sluiceway for the waste water, having an outlet for delivering its contents upon the screen, means for removing the fibers and other particles from the screen, a receptacle for the material thus removed, and a feeding-screw contained therein for discharging the material from the receptacle, substantially as described.

7. In an apparatus for recovering fibers and other particles from waste water, the combination of a horizontal screen, a sluiceway for the waste water having an outlet for delivering its contents upon the screen, means for forcing jets of water against the under side of the screen, and means for removing the accumulated fibers and other particles from the screen, at the end thereof, substantially as described.

8. In an apparatus for recovering fibers and other particles from waste water, the combination of a horizontal screen, a sluiceway for the waste water having an outlet for delivering its contents upon the screen, movable means for forcing jets of water against the under side of the screen, and means for removing the accumulated fibers and other particles from the screen, at the end thereof, substantially as described.

9. In an apparatus for recovering fibers and other particles from waste water, the combination of a horizontal screen, a sluiceway for the waste water, having an outlet for delivering its contents upon the screen, a pipe having orifices, located beneath the screen, by which jets of water are forced against the under side of the screen, means for moving said pipe back and forth, from end to end of the screen, and means for removing the accumulated fibers and other particles from the end of the screen, substantially as described.

In testimony whereof I have signed my name to this specification in the presence of two subscribing witnesses.

CARL BACHE-WÜG.

Witnesses:
B. J. NOYES,
H. B. DAVIS.